(12) United States Patent
Choi

(10) Patent No.: US 11,949,346 B2
(45) Date of Patent: Apr. 2, 2024

(54) INVERTER APPARATUS, CONTROL MODULE OF INVERTER APPARATUS, AND CONTROL METHODS THEREOF

(71) Applicant: HL MANDO CORPORATION, Gyeonggi-do (KR)

(72) Inventor: Bong Yeon Choi, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/835,964

(22) Filed: Jun. 9, 2022

(65) Prior Publication Data
US 2023/0283203 A1 Sep. 7, 2023

(30) Foreign Application Priority Data
Mar. 4, 2022 (KR) .......................... 10-2022-0027943

(51) Int. Cl.
*H02M 7/5387* (2007.01)
*B60L 55/00* (2019.01)
*H02M 1/00* (2006.01)
*H02M 1/08* (2006.01)
*H02M 1/12* (2006.01)

(52) U.S. Cl.
CPC ......... *H02M 7/53871* (2013.01); *B60L 55/00* (2019.02); *H02M 1/0003* (2021.05); *H02M 1/0032* (2021.05); *H02M 1/0064* (2021.05); *H02M 1/08* (2013.01); *H02M 1/12* (2013.01); *H02M 7/5387* (2013.01); *B60L 2210/40* (2013.01)

(58) Field of Classification Search
CPC ...... H02M 7/53871; H02M 1/08; H02M 1/12; H02M 7/5387; H02M 1/0064; H02M 1/0032; B60L 55/00; B60L 2210/40
USPC ..... 307/9.1, 10.1; 363/95, 40, 56.11; 322/25
See application file for complete search history.

(56) References Cited

U.S. PATENT DOCUMENTS

2012/0063179 A1* 3/2012 Gong ..................... H02M 1/12
363/40

* cited by examiner

*Primary Examiner* — Arnold M Kinkead
(74) *Attorney, Agent, or Firm* — Ladas & Parry, LLP

(57) ABSTRACT

The present disclosure relates to an inverter apparatus, a control module of the inverter apparatus, and control methods thereof, and more particularly, to an inverter apparatus enabling stable voltage control using active damping, a control module of the inverter apparatus, and control methods thereof.

18 Claims, 7 Drawing Sheets

INVERTER APPARATUS, CONTROL MODULE OF INVERTER APPARATUS, AND CONTROL METHODS THEREOF

BACKGROUND

1. Field of the Invention

One or more example embodiments relate to an inverter apparatus, a control module of the inverter apparatus, and control methods thereof, and more particularly, to an inverter apparatus enabling stable voltage control using an active damping, a control module of the inverter apparatus, and control methods thereof.

2. Description of the Related Art

The description in this section merely provides background information related to the present disclosure and do not constitute prior arts.

As a battery technology of an electric vehicle develops and the population who enjoys camping using a vehicle increases, methods for directly utilizing the battery of the electric vehicle for the camping are required.

To keep pace with this demand, recently, technology for a vehicle to load (V2L) system capable of supplying general power such as 110V or 220V to general load located inside or outside the electric vehicle, without a separate controller or connection device, is being developed.

In general, the V2L system includes a converter apparatus that converts a DC voltage of the battery in the electric vehicle to correspond to a rated voltage of the general load, and an inverter apparatus that converts the DC voltage converted by the converter apparatus into an AC voltage.

Also, the inverter apparatus includes an inverter circuit module that converts the DC voltage converted by the converter apparatus into the AC voltage and outputs the AC voltage, and a filter module that filters the AC voltage output from the inverter circuit module and outputs the filtered AC voltage.

In the filter module, a damping resistor may be disposed in series on a capacitor of the filter module, in order to secure stability during light-load operation or no-load operation of the inverter apparatus.

However, since additional electric power loss occurs in the damping resistor itself due to the addition of the damping resistor, efficiency of the inverter apparatus decreases. Further, additional heat is generated in the damping resistor itself, and a manufacturing process is complicated and cost is increased due to an additional design of a heat sink to prevent heat generation.

SUMMARY

Example embodiments of the present disclosure provide an inverter apparatus which is capable of securing stability of the inverter apparatus, increasing efficiency of the inverter apparatus, and preventing heat generation by using a virtual damping resistor, a control module of the inverter apparatus, and control methods thereof.

According to an example embodiment of the present disclosure, there is provided a control module of an inverter apparatus including a voltage controller configured to output a voltage control signal based on an error value that is a difference between an AC output voltage and a reference voltage of the inverter apparatus, a damping controller configured to output a damping control signal by reflecting a virtual damping component corresponding to a value of a virtual damping resistor to the AC output voltage, and a proportional controller configured to calculate, in consideration of an AC voltage output by an inverter circuit module in the inverter apparatus, a control signal for controlling the inverter circuit module from a signal obtained by subtracting the damping control signal from the voltage control signal.

According to another example embodiment of the present disclosure, there is provided a method performed in a control module of an inverter apparatus, including outputting a voltage control signal based on an error value that is a difference between an AC output voltage of the inverter apparatus and a reference voltage, outputting a damping control signal by reflecting a virtual damping component corresponding to a value of a virtual damping resistor to the AC output voltage, and calculating, in consideration of an AC voltage output from an inverter circuit module in the inverter apparatus, a control signal for controlling the inverter circuit module from a signal obtained by subtracting the damping control signal from the voltage control signal.

According to another example embodiment of the present disclosure, there is provided an inverter apparatus including an inverter circuit module configured to convert a DC input voltage into an AC voltage and output the AC voltage, a filter module connected to the inverter circuit module in series and configured to supply an AC output voltage obtained by filtering the AC voltage to a load, the filter module including no damping resistor, a control module configured to receive a feedback on the AC output voltage and calculate a control signal for controlling the inverter circuit module, and a switch driver module configured to control switching elements in the inverter circuit module to be turned on or off according to the control signal, wherein the control module is configured to calculate the control signal by reflecting a virtual damping component corresponding to a value of a virtual damping resistor.

According to another example embodiment of the present disclosure, there is provided a method performed in an inverter apparatus, including supplying, by a filter module of the inverter apparatus, an AC output voltage obtained by filtering an AC voltage output from an inverter circuit module of the inverter apparatus to a load, the filter module including no damping resistor, calculating, by a control module of the inverter apparatus, a control signal for controlling the inverter circuit module by receiving a feedback on the AC output voltage, and controlling, by a switch driver module of the inverter apparatus, switching elements in the inverter circuit module to be turned on or off according to the control signal, wherein the calculating of the control signal includes calculating the control signal by reflecting a virtual damping component corresponding to a value of a virtual damping resistor.

According to an example embodiment of the present disclosure, since a virtual damping resistor performs a function of an actual damping resistor, sufficient stability may be secured during light-load operation or no-load operation of an inverter apparatus.

Furthermore, according to an example embodiment of the present disclosure, a virtual damping resistor is used rather than a damping resistor disposed on a circuit, thereby increasing the efficiency of the inverter apparatus, and preventing heat generation due to the damping resistor.

DETAILED DESCRIPTION

Figure 1:
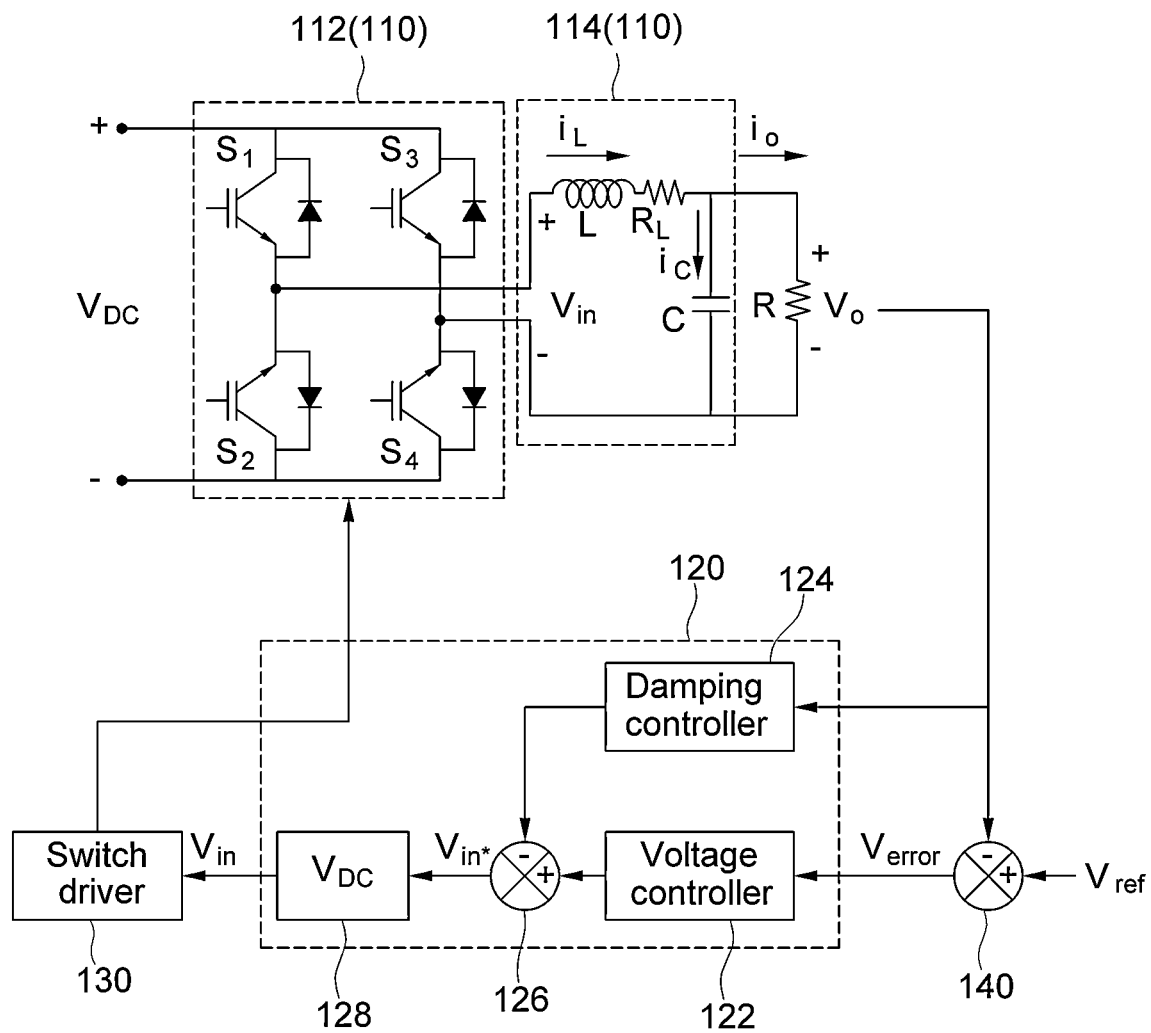
FIG. 1 is an exemplary block diagram illustrating a structure of an inverter apparatus.

Hereinafter, example embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing elements of example embodiments, terms such as first, second, A, B, (a), and (b) may be used. These terms are only for distinguishing an element from another element, and the essence, order, or sequence of the element is not limited by the terms. Throughout the specification, it will also be understood that when the terms "comprises/comprising" and/or "includes/including" are used herein, unless explicitly stated otherwise, they do not exclude another element but may mean that another element may be further included. In addition, terms such as " . . . er"and" . . . module" as used herein refer to units that perform at least one function or operation, and the units may be implemented as hardware or software or as a combination of hardware and software.

Figure 2:
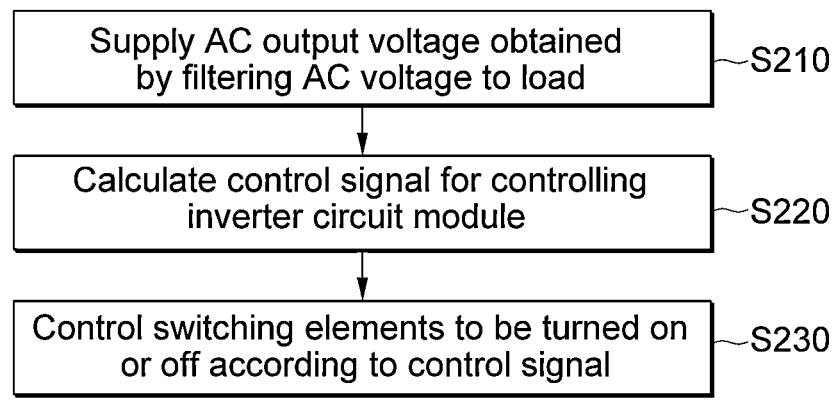
FIG. 2 is a flowchart illustrating a control method of an inverter apparatus.

FIG. 1 is an exemplary block diagram illustrating a structure of an inverter apparatus 100, and FIG. 2 is a flowchart illustrating a control method of the inverter apparatus 100.

The inverter apparatus 100 suggested through the present disclosure may be an inverter apparatus included in a vehicle to load (V2L) system. Further, the inverter apparatus 100 may be applied to not only the V2L system, but also other system or apparatus that generates power loss and heat due to a damping resistor.

As illustrated in FIG. 1, the inverter apparatus 100 may be configured to include an inverter circuit module 112, a filter module 114, a control module 120, and a switch driver module 130. The inverter circuit module 112 and the filter module 114 may constitute a single-phase inverter module 110 as illustrated in FIG. 1.

The inverter circuit module 112 may be configured to include a plurality of (e.g., four) switching elements S1, S2, S3 and S4. The inverter circuit module 112 may convert a DC input voltage $V_{DC}$ into an AC voltage $V_{in}$ and output the AC voltage $V_{in}$ by switching operations of the four switching elements.

The DC input voltage may be a voltage output from a battery to the inverter apparatus 100. In addition, the DC input voltage is a voltage applied between a converter apparatus (not shown) located at a front end and the inverter apparatus 100, and may be a voltage output from the converter apparatus or a voltage input to the inverter apparatus 100.

The switching elements may be implemented as a field effect transistor (FET), an insulated gate bipolar transistor (IGBT), a bipolar junction transistor (BJT), a metal oxide semiconductor field effect transistor (MOSFET), and the like.

In operation S210, the filter module 114 may be connected to the inverter circuit module 112 in series, calculate the AC output voltage $V_o$ by filtering the AC voltage output from the inverter circuit module 112, and supply the AC output voltage $V_o$ to the load.

The filter module 114 may be implemented as an LC filter or an LCL filter as illustrated in FIG. 1. The filter module 114 includes no damping resistor for decreasing a peak value (or, a resonance peak value) at a resonance point. A function of the damping resistor is performed by substituting the damping resistor with a virtual damping resistor in the control module 120 that will be described later.

In operation S220, the control module 120 may calculate a control signal ($V_{in}$ input to the switch driver module) by receiving a feedback on the AC output voltage. The control signal may be a signal for controlling the inverter circuit module 112, in other words, the switching elements in the inverter circuit module 112.

The control module 120 may calculate the control signal by reflecting a virtual damping component corresponding to a value of the virtual damping resistor. By such operation of the control module 120, the virtual damping resistor may substitute for the function of the damping resistor.

In operation S230, the switch driver module 130 may control the switching elements in the inverter circuit module 112 to be turned on or off according to instruction of the control signal. By controlling the switching elements to be turned on or off, the AC output voltage instructed (reflecting the virtual damping component) by the control signal may be output.

As described above, in the present disclosure, the virtual damping resistor performs a function of an actual damping resistor, and thus, sufficient stability may be secured during light-load operation or no-load operation of the inverter apparatus.

In addition, in the present disclosure, since the actual damping resistor is not disposed on a circuit, the efficiency of the inverter apparatus may be increased, and heat generation due to the actual damping resistor may be prevented.

Figure 3:
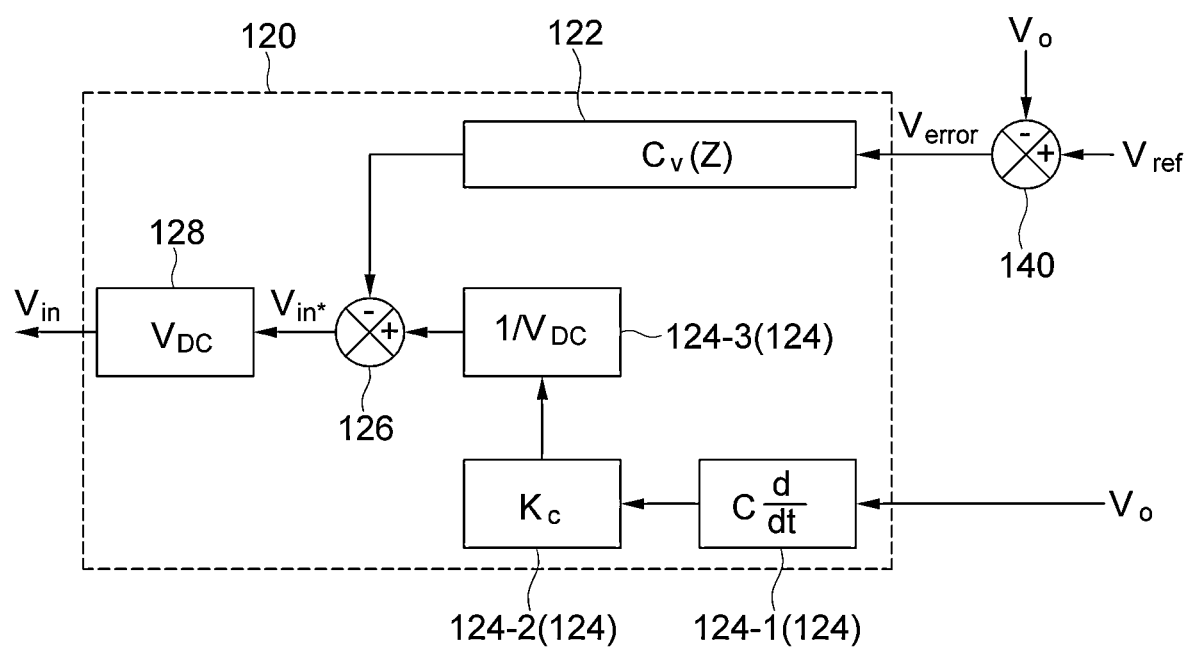
FIG. 3 is an exemplary block diagram illustrating a structure of a control module of an inverter apparatus.
Figure 4:
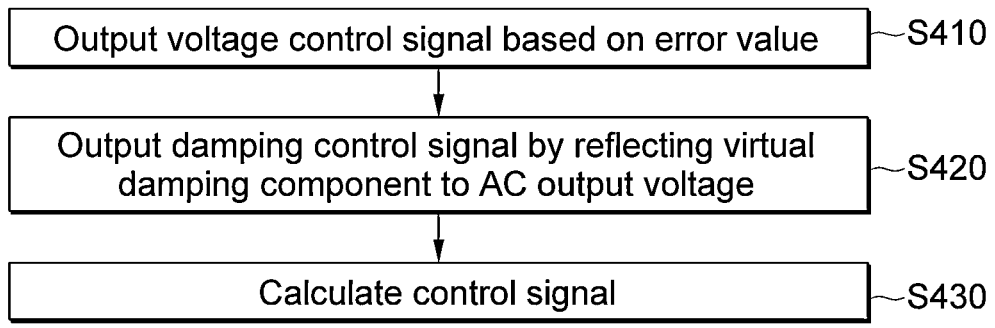
FIGS. 4 and 5 are flowcharts illustrating control methods of a control module.
Figure 5:
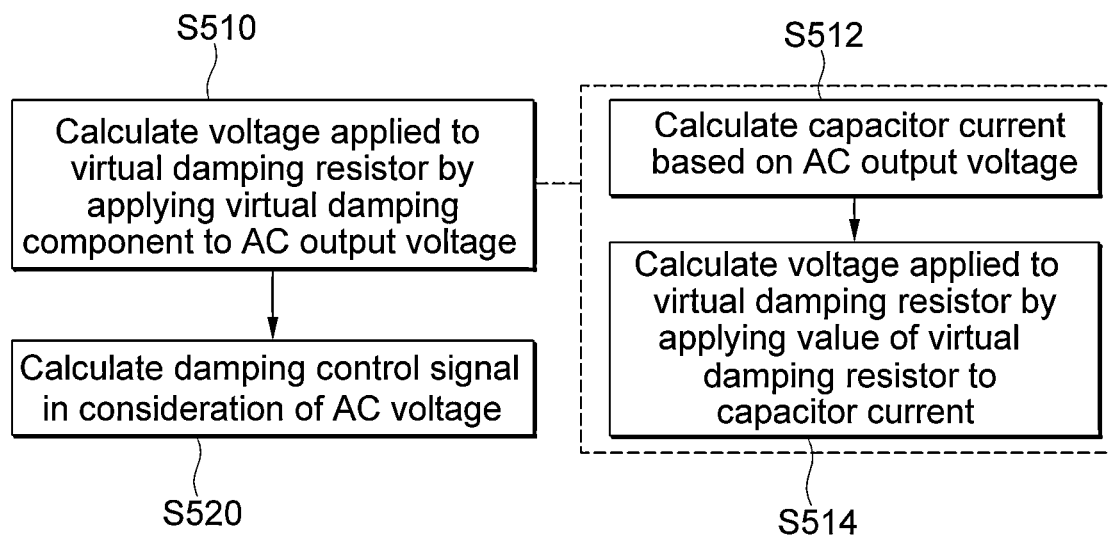

FIG. 3 is an exemplary block diagram illustrating a structure of a control module 120, and FIGS. 4 and 5 are flowcharts illustrating control methods performed in a control module 120.

As illustrated in FIGS. 1 and 3, the control module 120 may be configured to include a voltage controller 122, a damping controller 124, a subtractor 126, and a proportional controller 128.

In operation S410, the voltage controller 122 may output a voltage control signal based on an error value $V_{error}$ that is a difference between a reference voltage $V_{ref}$ and an AC output voltage.

The error value may be calculated by subtracting, by a comparator 140, the AC output voltage from the reference voltage, and the voltage controller 122 may calculate the voltage control signal by applying a voltage control gain $C_v(Z)$ to the error value.

The voltage controller 122 may be implemented as any one of a proportional integral (PI) controller, a proportional differential (PD) controller, and a proportional integral differential (PID) controller.

When the voltage controller 122 is implemented as the PI controller, the voltage controller 122 may integrate the error value, and calculate a voltage control signal by applying an integral gain to the integrated error value.

In operation S420, the damping controller 124 may output a damping control signal. The damping control signal may be calculated by reflecting a virtual damping component to the AC output voltage, and through this process, the virtual damping component corresponding to a value of the virtual resistor may be included in the damping control signal.

The subtractor 126 may subtract the damping control signal output from the damping controller 124, from the voltage control signal output from the voltage controller 122 (i.e., obtain a difference between the damping control signal and the voltage control signal). Assuming that a virtual resistor is connected to a filter capacitor in series, a voltage to be controlled by the inverter apparatus 100 is divided into a voltage applied to the filter capacitor and a voltage applied to the virtual resistor, and therefore, the voltage applied to the virtual resistor is subtracted for an active damping control.

In operation S430, the proportional controller 128 may calculate a control signal from a difference value $V_{in}*$ output from the subtractor 126. According to an example embodiment, a DC input voltage $V_{DC}$ may be considered when the control signal is calculated. For example, when the voltage controller 122 is configured such that an output of the voltage controller 122 is generated as a modulation value, the proportional controller 128 may calculate the control signal by multiplying the difference value $V_{in}*$ by the DC input voltage $V_{DC}$.

According to an example embodiment, the damping controller 124 may include voltage calculators 124-1 and 124-2, and a signal calculator 124-3, as illustrated in FIG. 3. Also, the voltage calculators 124-1 and 124-2 may include a current calculator 124-1, and a damping voltage calculator 124-2.

In operation S510, the voltage calculators 124-1 and 124-2 may calculate a voltage applied to the virtual damping resistor by applying the virtual damping component to the AC output voltage.

Specifically, in operation S512, the current calculator 124-1

$$\left( C \frac{d}{dt} \right)$$

may calculate a current (capacitor current $i_c$) flowing through the capacitor in the filter module 114, based on the AC output voltage. Further, in operation S514, the damping voltage calculator 124-2 may calculate the voltage applied to the virtual damping resistor by applying a value $K_c$ of the virtual damping resistor to the capacitor current.

In operation S520, the signal calculator 124-3 may calculate a damping control signal from the voltage applied to the virtual damping resistor. According to an example embodiment, the signal calculator 124-3 may calculate the damping control signal in consideration of the DC input voltage $V_{DC}$. For example, when the proportional controller 128 is configured to calculate the control signal by multiplying the difference value $V_{in}*$ by the DC input voltage $V_{DC}$, the signal calculator 124-3 may calculate the damping control signal by dividing ($1/V_{DC}$) the voltage applied to the virtual damping resistor by the DC input voltage.

Figure 6:
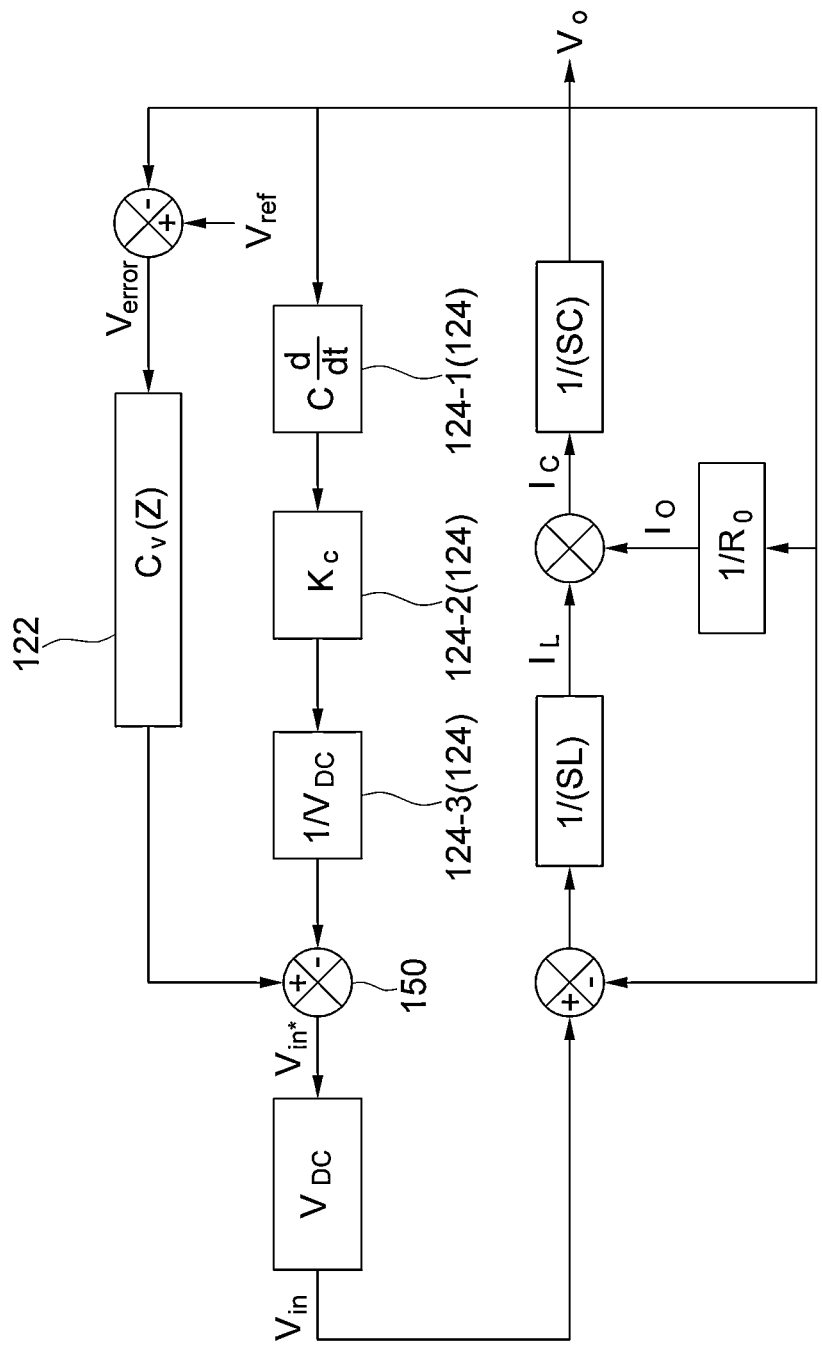
FIG. 6 is an exemplary block diagram illustrating a function of an inverter apparatus.

FIG. 6 is an exemplary block diagram illustrating a function of an inverter apparatus.

When an error value obtained by subtracting an AC output voltage from a reference voltage is calculated, the voltage controller 122 may calculate a voltage control signal by applying a voltage control gain $C_v(Z)$ to the error value.

The current calculator 124-1 may calculate a capacitor current based on the AC output voltage, the damping voltage calculator 124-2 may calculate a voltage applied to a virtual damping resistor by applying a value $K_c$ of the virtual damping resistor to the capacitor current, and the signal calculator 124-3 may calculate a damping control signal from the voltage applied to the virtual damping resistor by considering ($1/V_{DC}$) a DC input voltage.

The subtractor 126 may output a difference value $V_{in}*$ by subtracting the damping control signal output from the damping controller 124, from the voltage control signal output from the voltage controller 122, and the proportional controller 128 may calculate a control signal from the difference value in consideration of the DC input voltage $V_{DC}$.

After a value of the AC output voltage is subtracted from the calculated control signal, the calculated control signal may be converted into an inductor current ($I_L$) by applying an impedance of an inductor in the filter module 114, and the AC output voltage may be converted into a load current $I_0$ by applying an output impedance $R_0$ is applied.

When the load current is subtracted from the inductor current, the capacitor current $I_c$ flowing through the capacitor in the filter module 114 may be calculated, and an AC output voltage may be calculated by applying (1/SC) the impedance of the capacitor in the filter module 114 to the capacitor current.

A plant model of the inverter apparatus 100 described above may be represented by a transfer function $G_{vm}(S)$, as shown below.

$$[\text{Transfer function}] \; G_{vm}(S) = \frac{\frac{V_{DC}}{LC_0}}{S^2 + S\frac{W_0}{Q} + w_0^2}$$

In the above transfer function, $V_{DC}$ denotes the DC input voltage, L denotes an inductance of the inductor in the filter module 114, and Co denotes a capacitance of a capacitor in the filter module 114. In addition, wo denotes a resonance frequency, of which a value is $$\frac{1}{\sqrt{LC_0}},$$

Q denotes a Q factor, of which a value is $$\frac{1}{\sqrt{LC_0}\,(L + K_c R_0 C_0)}.$$

According to the above transfer function, as $K_c$ which is a value of the virtual resistor increases, a value of the Q factor decreases, and thus, it may be seen that a peak value decreases at a resonance point.

Figure 7:
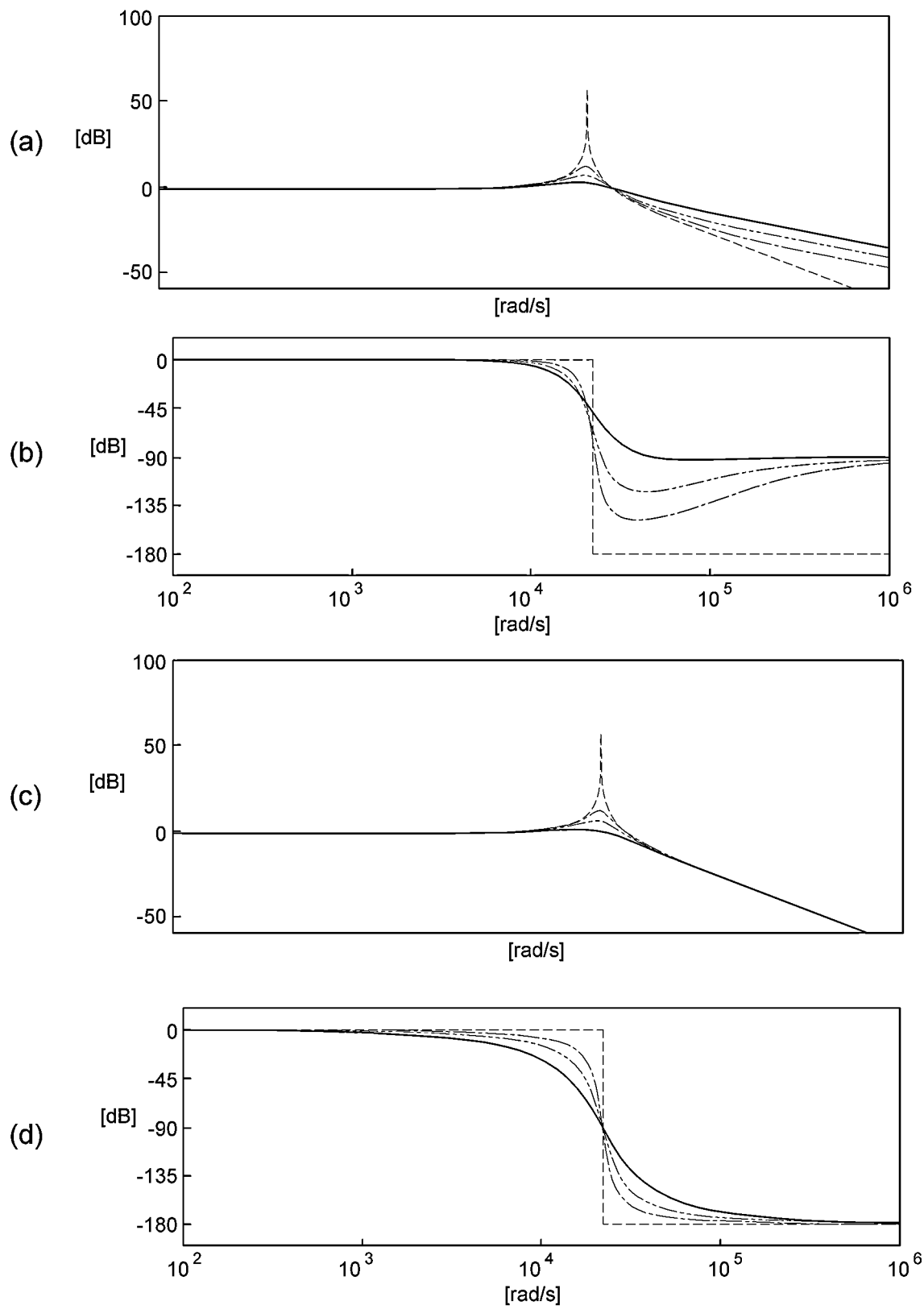
FIG. 7 illustrates a comparison between a conventional inverter apparatus to which a damping resistor is applied and an inverter apparatus of the present disclosure.

FIG. 7 illustrates a comparison between a conventional inverter apparatus to which a damping resistor is applied and an inverter apparatus 100 of the present disclosure, to which a virtual damping resistor is applied.

(a) of FIG. 7 illustrates a result of calculating a magnitude (dB) of a plant model while varying a value of the damping resistor in the conventional inverter apparatus, and (b) of FIG. 7 illustrates a result of calculating a phase (deg) of a plant model while varying a value of the damping resistor in the conventional inverter apparatus. (c) of FIG. 7 illustrates a result of calculating a magnitude of a plant model while varying a value of the virtual damping resistor in the inverter apparatus 100 of the present disclosure, and (d) of FIG. 7 illustrates a result of calculating a phase of a plant model while varying a value of the virtual damping resistor in the inverter apparatus 100 of the present disclosure.

A graph with a dotted line indicates values of the damping resistor and the virtual damping resistor being 0 [ohm], a graph with a dashed-single dotted line indicates values of the damping resistor and the virtual damping resistor being 1 [ohm], a graph with a dashed-double dotted line indicates values of the damping resistor and the virtual damping resistor being 2 [ohm], and a graph with a solid line indicates values of the damping resistor and the virtual damping resistor being 4 [ohm].

As seen from the comparison illustrated in FIG. 7, when the value of the virtual damping resistor increases, the peak value decreases at the resonance point. In other words, even when the virtual damping resistor is used, the peak value may decrease at the resonance point, like the actual damping resistor being used, and through this process, sufficient stability may be secured during light-load operation or no-load operation of the inverter apparatus 100.

Although FIGS. 2, 4 and 5 illustrate that each process is sequentially executed, the example embodiment of the present disclosure is merely described for illustrative purpose. In other words, those skilled in the art may execute the processes by changing the orders described with reference to FIGS. 2, 4 and 5, or may apply various modifications and variations such that one or more of the processes are executed in parallel, without departing from essential characteristics of the disclosure. Accordingly, FIGS. 2, 4 and 5 are not limited to a time-sequential order.

Although example embodiments of the present disclosure have been described for illustrative purposes, those skilled in the art will appreciate that various modifications and variations are possible, without departing from essential characteristics of the disclosure.

Therefore, example embodiments of the present disclosure have not been described for limiting purposes. Accordingly, the scope of the disclosure is not to be limited by the above example embodiments but by the claims and the equivalents thereof. The protection scope of this embodiment should be interpreted by the following claims, and all technical ideas within the scope equivalent thereto should be interpreted as being included in the scope of the present embodiment.

EXPLANATION OF REFERENCE NUMERALS

100: Inverter apparatus
110: Inverter module
112: Inverter circuit module
114: Filter module
120: Control module
122: Voltage controller
124: Damping controller
124-1: Current calculator
124-2: Damping voltage calculator
124-3: Signal calculator
126: Subtractor
128: Proportional controller
130: Switch driver module

What is claimed is:

1. A control module of an inverter apparatus, the control module comprising:
    a voltage controller configured to output a voltage control signal, based on an error value that is a difference between an AC output voltage of the inverter apparatus and a reference voltage wherein the voltage controller comprises one of a proportional integral (PI) controller, a proportional differential (PD) controller, and a proportional integral differential (PID) controller;
    a damping controller configured to output a damping control signal by reflecting a virtual damping component corresponding to a value of a virtual damping resistor to the AC output voltage; and
    a proportional controller configured to calculate, in consideration of an AC voltage output from an inverter circuit module in the inverter apparatus, a control signal for controlling the inverter circuit module from a signal obtained by subtracting the damping control signal from the voltage control signal.

2. The control module of claim 1, wherein the damping controller is configured to:
    calculate a voltage applied to the virtual damping resistor, by applying the virtual damping component to the AC output voltage; and
    calculate the damping control signal from the calculated voltage, in consideration of the AC voltage.

3. The control module of claim 2, wherein the damping controller is configured to:
    calculate a capacitor current of a filter module, based on the AC output voltage; and
    calculate the voltage applied to the virtual damping resistor, by applying the value of the virtual damping resistor to the capacitor current.

4. A method performed in a control module of an inverter apparatus, the method comprising:
    outputting a voltage control signal, based on an error value that is a difference between an AC output voltage of the inverter apparatus and a reference voltage, wherein the outputting of the voltage control signal is performed by one of a proportional integral (PI) controller, a proportional differential (PD) controller, and a proportional integral differential (PID) controller;
    outputting a damping control signal by reflecting a virtual damping component corresponding to a value of a virtual damping resistor to the AC output voltage; and
    calculating, in consideration of an AC voltage output from an inverter circuit module in the inverter apparatus, a control signal for controlling the inverter circuit module from a signal obtained by subtracting the damping control signal from the voltage control signal.

5. The method of claim 4, wherein the outputting of the damping control signal comprises:
    calculating a voltage applied to the virtual damping resistor by applying the virtual damping component to the AC output voltage; and
    calculating the damping control signal from the calculated voltage in consideration of the AC voltage.

6. The method of claim 5, wherein the calculating of the voltage comprises:
    calculating a capacitor current of a filter module based on the AC output voltage; and
    calculating the voltage applied to the virtual damping resistor by applying a value of the virtual damping resistor to the capacitor current.

7. The method of claim 4, wherein the outputting of the voltage control signal comprises calculating the voltage control signal by integrating the error value and applying an integral gain to the integrated error value.

8. An inverter apparatus comprising:
   an inverter circuit module configured to convert a DC input voltage into an AC voltage, and output the AC voltage;
   a filter module connected to the inverter circuit module in series, and configured to supply an AC output voltage obtained by filtering the AC voltage to a load, the filter module including no damping resistor;
   a control module configured to calculate a control signal for controlling the inverter circuit module by receiving a feedback on the AC output voltage; and
   a switch driver module configured to control switching elements in the inverter circuit module to be turned on or off according to the control signal,
   wherein the control module is configured to calculate the control signal by reflecting a virtual damping component corresponding to a value of a virtual damping resistor, and
   wherein the inverter apparatus is included in a vehicle to load (V2L) system, and wherein the DC input voltage is a DC link voltage.

9. The inverter apparatus of claim 8, wherein the control module comprises:
   a voltage controller configured to output a voltage control signal, based on an error value that is a difference between a reference voltage and the AC output voltage;
   a damping controller configured to output a damping control signal, by reflecting the virtual damping component to the AC output voltage; and
   a proportional controller configured to calculate the control signal from a signal obtained by subtracting the damping control signal from the voltage control signal, in consideration of the AC voltage.

10. The inverter apparatus of claim 9, wherein the damping controller is configured to:
    calculate a voltage applied to the virtual damping resistor by applying the virtual damping component to the AC output voltage; and
    calculate the damping control signal from the calculated voltage in consideration of the AC voltage.

11. The inverter apparatus of claim 10, wherein the damping controller is configured to:
    calculate a capacitor current of the filter module based on the AC output voltage; and
    calculate the voltage applied to the virtual damping resistor by applying the value of the virtual damping resistor to the capacitor current.

12. An inverter apparatus comprising:
    an inverter circuit module configured to convert a DC input voltage into an AC voltage, and output the AC voltage;
    a filter module connected to the inverter circuit module in series, and configured to supply an AC output voltage obtained by filtering the AC voltage to a load, the filter module including no damping resistor;
    a control module configured to calculate a control signal for controlling the inverter circuit module by receiving a feedback on the AC output voltage; and
    a switch driver module configured to control switching elements in the inverter circuit module to be turned on or off according to the control signal,
    wherein the control module is configured to calculate the control signal by reflecting a virtual damping component corresponding to a value of a virtual damping resistor,
    wherein the control module comprises:
    a voltage controller configured to output a voltage control signal, based on an error value that is a difference between a reference voltage and the AC output voltage;
    a damping controller configured to output a damping control signal, by reflecting the virtual damping component to the AC output voltage; and
    a proportional controller configured to calculate the control signal from a signal obtained by subtracting the damping control signal from the voltage control signal, in consideration of the AC voltage; and
    wherein the voltage controller is any one of a proportional integral (PI) controller, a proportional differential (PD) controller, and a proportional integral differential (PID) controller.

13. The inverter apparatus of claim 8, wherein the filter module is an LC filter or an LCL filter.

14. A method performed in an inverter apparatus, the method comprising:
    converting a DC input voltage into an AC voltage and outputting the AC voltage;
    supplying, by a filter module of the inverter apparatus, an AC output voltage obtained by filtering the AC voltage output from an inverter circuit module of the inverter apparatus to a load, the filter module including no damping resistor;
    calculating, by a control module of the inverter apparatus, a control signal for controlling the inverter circuit module by receiving a feedback on the AC output voltage; and
    controlling, by a switch driver module of the inverter apparatus, switching elements in the inverter circuit module to be turned on or off according to the control signal,
    wherein the calculating of the control signal comprises calculating the control signal by reflecting a virtual damping component corresponding to a value of a virtual damping resistor, and
    wherein the inverter apparatus is included in a vehicle to load (V2L) system, and wherein the DC input voltage is a DC link voltage.

15. The method of claim 14, wherein the calculating of the control signal comprises:
    outputting a voltage control signal, based on an error value that is a difference between a reference voltage and the AC output voltage;
    outputting a damping control signal by reflecting the virtual damping component to the AC output voltage; and
    calculating the control signal from a signal obtained by subtracting the damping control signal from the voltage control signal, in consideration of the AC voltage.

16. The method of claim 15, wherein the outputting of the damping control signal comprises:
    calculating a voltage applied to the virtual damping resistor by applying the virtual damping component to the AC output voltage; and
    calculating the damping control signal from the calculated voltage in consideration of the AC voltage.

17. The method of claim 16, wherein the calculating of the voltage comprises:
    calculating a capacitor current of the filter module based on the AC output voltage; and calculating the voltage applied to the virtual damping resistor by applying the value of the virtual damping resistor to the capacitor current.

18. A method performed in an inverter apparatus, the method comprising:
- supplying, by a filter module of the inverter apparatus, an AC output voltage obtained by filtering an AC voltage output from an inverter circuit module of the inverter apparatus to a load, the filter module including no damping resistor;
- calculating, by a control module of the inverter apparatus, a control signal for controlling the inverter circuit module by receiving a feedback on the AC output voltage; and
- controlling, by a switch driver module of the inverter apparatus, switching elements in the inverter circuit module to be turned on or off according to the control signal, wherein the calculating of the control signal comprises calculating the control signal by reflecting a virtual damping component corresponding to a value of a virtual damping resistor, wherein the calculating of the control signal comprises:
- outputting a voltage control signal, based on an error value that is a difference between a reference voltage and the AC output voltage;
- outputting a damping control signal by reflecting the virtual damping component to the AC output voltage; and
- calculating the control signal from a signal obtained by subtracting the damping control signal from the voltage control signal, in consideration of the AC voltage, and wherein the outputting of the voltage control signal comprises calculating the voltage control signal by integrating the error value and applying an integral gain to the integrated error value.

* * * * *